United States Patent
Atkinson

(10) Patent No.: US 8,523,113 B2
(45) Date of Patent: Sep. 3, 2013

(54) BONDING OF THERMOPLASTICS

(75) Inventor: James William Atkinson, East Cowes (GB)

(73) Assignee: GKN Aerospace Services Limited, East Cowes, Hampshire (GB)

( * ) Notice: Subject to any disclaimer, the term of this patent is extended or adjusted under 35 U.S.C. 154(b) by 484 days.

(21) Appl. No.: 12/738,371

(22) PCT Filed: Oct. 15, 2008

(86) PCT No.: PCT/GB2008/003500
§ 371 (c)(1),
(2), (4) Date: Aug. 16, 2010

(87) PCT Pub. No.: WO2009/050460
PCT Pub. Date: Apr. 23, 2009

(65) Prior Publication Data
US 2010/0308173 A1 Dec. 9, 2010

(30) Foreign Application Priority Data
Oct. 18, 2007 (GB) .................................. 0720415.9

(51) Int. Cl.
*B64D 15/12* (2006.01)
(52) U.S. Cl.
USPC ..................................................... 244/134 D
(58) Field of Classification Search
USPC ..................... 244/134 R, 134 A–134 F, 171.8
See application file for complete search history.

(56) References Cited

U.S. PATENT DOCUMENTS

| 4,875,644 | A | * | 10/1989 | Adams et al. | ............. 244/134 R |
| 5,412,181 | A | | 5/1995 | Giamati | |
| 2002/0153368 | A1 | * | 10/2002 | Gardner et al. | ............... 219/545 |

FOREIGN PATENT DOCUMENTS

| EP | 0 680 878 A | 11/1995 |
| FR | 2 202 810 A | 5/1974 |
| FR | 2 736 500 A | 1/1997 |
| GB | 2 438 389 A | 11/2007 |
| JP | 10199664 | 7/1998 |
| WO | 93/19926 A | 10/1993 |
| WO | 01/43507 A | 6/2001 |
| WO | 2004/049763 A | 6/2004 |

OTHER PUBLICATIONS

International Search Report and Written Opinion dated Mar. 19, 2009 in connection with PCT/GB2008/003500.
International Preliminary Report on Patentability dated Feb. 2, 2010 in connection with PCT/GB2008/003500.

* cited by examiner

*Primary Examiner* — Timothy D Collins
*Assistant Examiner* — Brian M O'Hara
(74) *Attorney, Agent, or Firm* — Quarles & Brady LLP

(57) ABSTRACT

An aircraft leading edge ice protection system. The system includes: a thermoelectric heater mat (10) attachable to a leading edge component of an aircraft, the heater mat comprising: an electrically resistive heater element (12, 22) embedded in a thermoplastic layer (16, 26, 28), the thermoplastic layer having a first surface; and a first adhesive (20) receiving layer (18) located on a surface of the thermoplastic layer. A method of making an aircraft leading edge ice protection system, the method comprising: making a thermoelectric heater mat by embedding an electrically resistive heater element in a thermoplastic layer, the thermoplastic layer having a first surface; and locating a first adhesive receiving layer on a surface of the thermoplastic layer.

26 Claims, 4 Drawing Sheets

BONDING OF THERMOPLASTICS

CROSS REFERENCE TO RELATED APPLICATIONS

This application represents the national stage application of International Application PCT/GB2008/003500 filed 15 Oct. 2008, which claims priority of Great Britain Patent Application No. 0720415.9 filed 18 Oct. 2007, which are incorporated herein by reference in their entirety for all purposes.

BACKGROUND OF THE INVENTION

This invention relates to a heater mat and a method of making a heater mat.

Known heater mats such as those that can be used as part of a de-icing system for a leading edge of an aircraft include a thermoelectric heater element and one or more layers of a dielectric material such as Kapton. The dielectric protects the thermoelectric heater element and can serve to electrically insulate it from a metallic surface (such as an inner surface of an aircraft leading edge) to which the heater mat is to be applied.

Heater mats of this kind suffer from a number of problems.

A first problem is that dielectric materials hitherto used in heater mats have limited operating temperatures. The maximum operating temperatures of hitherto used dielectrics limits the amount of heating power known heater mats can produce. Additionally, the limited temperatures that hitherto used dielectrics limits can withstand exacerbate problems associated with the development of "hot spots" in a heater mat (for example due to internal short circuits or other failures), potentially leading to catastrophic failure.

Another problem is that the condition of some dielectric materials such as Kapton can deteriorate over time. This can lead to failure of the heater mat on exposure of the thermoelectric heater element to moisture, and/or can lead to short circuiting of the thermoelectric heater element on a metallic surface to which the heater mat is applied.

This invention has been made in consideration of at least some of the problems indicated above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

According to an aspect of the invention, there can be provided an aircraft leading edge ice protection system. The system includes a thermoelectric heater mat attachable to a leading edge component of an aircraft. The heater mat includes an electrically resistive heater element embedded in a thermoplastic layer, the thermoplastic layer having a first surface. The heater mat also includes a first adhesive receiving layer located on the first surface of the thermoplastic layer.

According to another aspect of the invention, there can be provided a method of making an aircraft leading edge ice protection system. The method includes making a thermoelectric heater mat by embedding an electrically resistive heater element in a thermoplastic layer, the thermoplastic layer having a first surface. The method also includes locating a first adhesive receiving layer on the first surface of the thermoplastic layer.

The thermoplastic layer can comprise Polyetheretherketone (PEEK).

Thermoplastics such as PEEK have excellent mechanical properties that make them resilient against the kinds of deterioration that can affect the kinds of dielectrics hitherto used in heater mats. Thermoplastics such as PEEK can also withstand higher temperatures than the hitherto employed dielectric materials, allowing heater mats according to an embodiment of the invention to output more heating power than known heater mats.

Adhesives (such as resins) typically do not form a good bond with thermoplastic, making them unsuitable as a means for attaching a thermoplastic heater mat to a leading edge component. This problem is solved in accordance with an embodiment of the invention by the provision of one or more adhesive receiving layers at a surface of the thermoplastic.

In one embodiment, a second adhesive receiving layer can be located on a surface of the thermoplastic layer, for example on a surface that is opposite the first surface of the thermoplastic layer. In this way, the heater mat can be sandwiched between (an adhered to) two components of an aircraft leading edge. The heater mat may itself be used in this way as a means of attaching components (such as a rib and a skin) of an aircraft leading edge together.

In some embodiments, the or each adhesive receiving layer can be partially embedded within the thermoplastic layer such that it protrudes from a surface of the thermoplastic layer. This allows robust attachment of the adhesive receiving layer to the thermoplastic, while still allowing the adhesive receiving layer to receive an adhesive for attaching the heater mat to another object. Alternatively, a layer intermediate the thermoplastic and the or each adhesive receiving layer can be provided for attaching the or each adhesive receiving layer to the thermoplastic.

In one embodiment, the or each adhesive receiving layer can comprise a fibrous material. Examples of suitable fibrous materials include glass cloth, Kevlar, carbon fibre and S ceramic fibre.

The heater mat can further comprise a stabilising layer embedded in the thermoplastic layer. This can improve the stability of, for example, a metal sprayed electrically resistive heater element and of the thermoplastic during the heating process. In one example, the heater element can be sprayed directly onto the stabilising layer using the metal spraying process described above.

In some embodiments, more than one such stabilising layer can be provided. In one embodiment, the heater element can be located in between two stabilising layers. The stabilising layer can, for example, comprise a glass.

The heater mat can be provided with a double-curved shape to conform with a corresponding double-curved surface of an aircraft leading edge component to which the heater mat is to be applied. This double curved shape can be achieved using a mould.

The heater mat can be applied to an aircraft leading edge component using an adhesive that is applied to the first adhesive receiving layer. Similarly, where two or more adhesive receiving layers are provided, adhesive can be applied to each such layer—a further object such as a supporting rib of the leading edge component can then be attached to the heater mat.

According to a further aspect of the invention, there can be provided an aircraft leading edge component comprising an aircraft leading edge ice protection system of the kind described above. The aircraft leading edge component may, for example, comprise an aircraft wing.

According to another aspect of the invention, there can be provided an aircraft comprising an aircraft leading edge component of the kind described above.

BRIEF DESCRIPTION OF THE DRAWINGS

For a better understanding of the invention and to show how the same may be carried into effect reference is now made by way of example only to the accompanying drawings in which like reference signs relate to like elements and in which.

Figure 1:
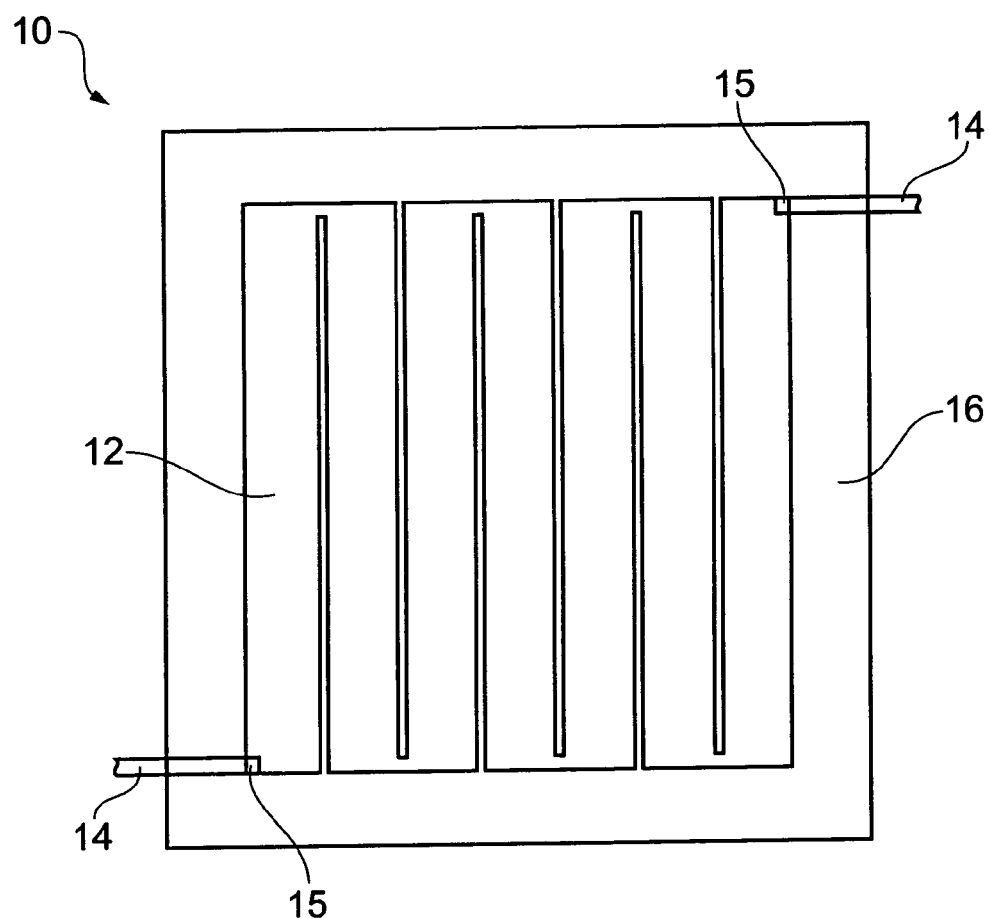
FIGS. 1 and 2 show different views of an example of a heater mat in accordance with an embodiment of the invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Particular embodiments will now be described by way of example only in the following with reference to the accompanying drawings.

According to an embodiment of this invention, there can be provided an aircraft leading edge ice protection system. The system includes a thermoelectric heater mat that includes a thermoplastic layer within which is embedded an electrically resistive heater element. The heater mat is provided with one or more adhesive receiving layers to facilitate attachment of the mat to a surface using an adhesive. Embodiments of this invention also provide methods of making such an ice protection system.

Thermoplastics are characterised by their material properties as a function of temperature. In particular, thermoplastic materials are plastic (deformable) in a temperature between an upper transition temperature $T_m$ and a lower transition temperature $T_g$. Above $T_m$, thermoplastic materials melt to form a liquid. Below $T_g$ they enter a brittle, glassy state. In the temperature range between $T_g$ and $T_m$, thermoplastics typically include a mixture of amorphous and crystalline regions. It is the amorphous regions that contribute to the elasticity/deformability of a thermoplastic in this phase.

It should be noted that $T_g$ and $T_m$ may not be well defined in practice, and freezing to the glassy state below $T_g$ and melting above $T_m$ may actually take place over a temperature range or window centred on $T_g$ and $T_m$, respectively.

As described herein, thermoplastic materials exhibit good mechanical qualities and can operate at relatively high temperatures, due to their high melting points.

Thermoplastics that may be used in accordance with an embodiment of this invention include polyarylketones such as PEEK, PEK, PEKEKK and PEKK. Other examples of suitable thermoplastics include polyarylsulphones and polyarylimides.

While, according to an embodiment of the invention, thermoplastics have been found to constitute a significant improvement on the kinds of material previously used, the mechanical resilience and high temperature performance of the thermoplastic Polyetheretherketone (PEEK, and also known as polyketone) makes it particularly suitable for use in a heater mat of the kind described herein.

PEEK has a melting point $T_m \approx 350°$ C., which allows it to be used in heater mats that operate at relatively high temperatures. The typical operating temperature of a thermoelectric heater mat may be of the order of 30° C. Nevertheless, under some operating conditions (such as where short burst of heat are applied), the upper operating temperature may be as high as 260° C. or more. Unusually, PEEK has two glass transition temperatures ($T_{g1} \approx 130\text{-}150°$ C.; $T_{g2} \approx 260\text{-}290°$ C.), depending on the cure cycle and formulation of the PEEK.

Due to the provision of a thermoplastic layer, a heater mat according to an embodiment of this invention is more mechanically robust than known heater mats. A heater mat according to an embodiment of the invention can also provide greater heating power than known heater mats due to the high temperature capability of thermoplastics such as PEEK.

According to an embodiment of the invention, it has been found that the combination of a high through thickness strength, a high Young's modulus ($E \approx 3700$ MPa), a high tensile strength ($\sigma \approx 90$ MPa), a high melting point ($T_m \approx 350°$ C.) and good wear resistance of PEEK make it particularly useful in the context of heater mats for ice protection systems for aircraft leading edges. As described below, the high through thickness strength of thermoplastics such as PEEK can allow the use of a heater mat according to an embodiment of the invention to be used to bond together structural, load bearing components (in particular, a supporting rib and a skin) of an aircraft leading edge.

Figure 2:
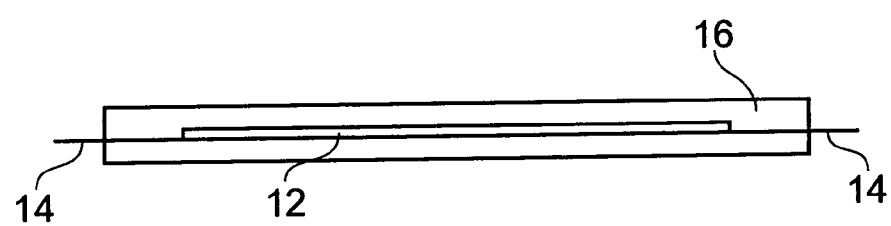

FIGS. 1 and 2 show a top view and a side view (respectively) of an example of a heater mat 10 in accordance with an embodiment of the invention.

Heater mats of this kind find particular application in the field of ice protection systems for aircraft, although other uses are envisaged. When used as part of an ice protection system for an aircraft, a heater mat according to an embodiment of the invention can be attached (e.g. fused or adhered) to an inner surface of a leading edge component of the aircraft. Heat produced by the heater mat is transferred to the leading edge, thereby preventing a build up of ice which would otherwise degrade the aerodynamic performance of the leading edge.

The example heater mat 10 shown in FIG. 1 includes an electrically resistive heater element 12. The heater element 12 may typically comprise a layer of electrically resistive material, such as a metal. In use, an electric current is passed through the heater element 12 to produce Joule heating. The heater element 12 can be made from any suitable electrically resistive material, typically a metal such as copper or aluminium. A typical thickness of the heater element can be approximately 0.1 mm in the case of a sprayed metal heater mat (see below). Other kinds of heater element (for example an element manufactured by plating) may be as thin as 0.001 mm.

In this example, the heater element 12 is patterned in a series of interconnected strips, forming a current path. In other examples, a different patterning can be selected in accordance with design requirements. Alternatively, the patterning may be omitted.

The electrically resistive heater element 12 is embedded in a thermoplastic layer 16. As shown in FIG. 2, in this example, the heater element 10 is completely embedded in the thermoplastic layer 16. In other examples, portions of the heater element 12 may not be entirely embedded within the thermoplastic layer 16. For example, a portion of the heater element 12 may protrude from the thermoplastic layer 16 to allow the attachment of current carrying leads. In the present example, separate current carrying leads 14 are provided to allow connection of a completely embedded heater element to an external current supply (not shown). As illustrated in FIGS. 1 and 2, the leads 14 in this example extend into the heater mat from a position at the periphery of the thermoplastic layer 16, to form terminations 15 with the heater element 12.

The leads can be made from, for example, copper or any other suitable conductor. In this regard, it is noted that copper leads have been found to form an excellent electrical contact with a heater element embedded in a PEEK thermoplastic layer.

A heater mat of the kind described herein can be applied (e.g. adhered) to a surface to which heating power is to be supplied. An example of such a surface is an inner surface of an aircraft leading edge component (for example the leading edge of a wing slat or engine nacelle). The heater element 12 is electrically insulated from the surface (which may be metallic) by the thermoplastic layer 16.

Figure 3:
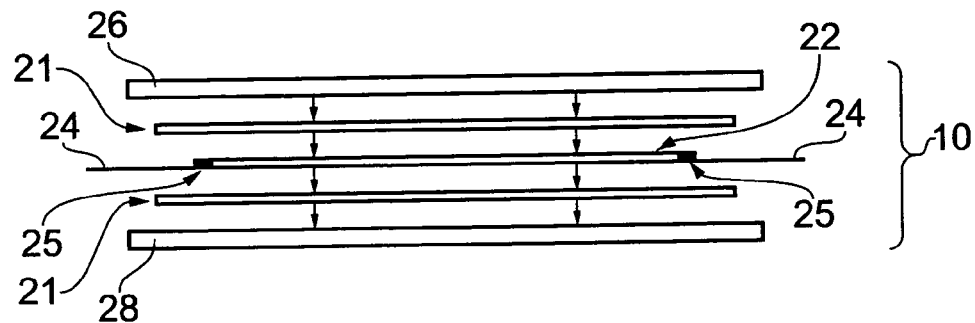
FIG. 3 illustrates an example of a process for making a heater mat in accordance with an embodiment of the invention.

FIG. 3 illustrates an example of a process for making a heater mat 10 in accordance with an embodiment of the invention. In particular, the process illustrated in FIG. 3 is suitable for construction of a heater mat 10 of the kind shown in FIG. 1.

As shown in FIG. 3, the heater mat 10 can be constructed by applying an electrically resistive heater element 22 to a first thermoplastic layer 28. The heater element 22 can be applied by a variety of methods, such as by a metal spraying process. If required, the heater element 22 can be patterned as described above in relation to FIG. 1. The patterning can be achieved using a masking and/or etching process.

In one embodiment, one or more stabilising layers 21 can be provided in the heater mat 10. The purpose of the stabilising layer(s) 21 is to stabilise the material making up the heater element 22 so that when the assembly is heated (as described below), migration of the heater element material is inhibited. It has also been found that the stabilising layer(s) can serve to enhance the thermal conductivity of the heater mat 10 during use.

In one example, the stabilising layer(s) 21 can comprise a glass. The glass can be added as a thin layer 21 adjacent the heater element 22. Where more than one stabilising layer 21 is used, a layer of glass can be provided on either side of the heater element 22 as shown in the example of FIG. 3.

In one embodiment, the heater element 22 can be applied (e.g. using a metal spraying process) to a layer of glass 21 that is laid over the first thermoplastic layer 28. A second layer of glass 21 can optionally be laid of the sprayed metal heater element 12 and then the second layer of thermoplastic 26 can be laid over the second layer of glass 21. The resulting thermoplastic/stabiliser/heater/stabiliser/thermoplastic sandwich structure can then be heated as described below.

It should be noted that the inclusion of a stabilising layer 21 such as a glass layer in the heater mat can reduce the flexibility of the mat. Accordingly, a thin layer of glass may be preferred, which can add stability during the manufacture process without having an overly adverse affect on the flexibility of the resulting heater mat.

As described above, leads 24 can be provided to form terminations 25 with the heater element 22. In some examples, the leads 24 can be formed using the same process as that used to provide the heater element itself. In the present example however, the leads 24 are provided as separate copper strips that are laid over the heater element 22 and the first thermoplastic layer 28.

Once the heater element 22 (and, if appropriate, the leads 24 and the stabilisation layer(s) 21) are in place, a second thermoplastic layer 26 can be applied to the assembly. The assembly is then heated to fuse the first (28) and second (26) layers of thermoplastic together. The heating can be applied by, for example, laying the assembly including the first and second thermoplastic layers on a heating plate (e.g. a metallic plate). Typically, the assembly is heated to a temperature above the melting point of the thermoplastic (e.g. when PEEK is used, the heating temperature is typically in the region of 360-380° C.), to allow the fusing process to take place. After heating, the assembly is cooled below the glass transition temperature $T_g$, whereby the thermoplastic enters a glassy state. In some examples, the cooling can take place rapidly (quenching), to prevent unwanted crystallisation of the thermoplastic.

Following heating, then cooling, the first (28) and second (26) layers of thermoplastic become fused together, forming a single thermoplastic layer (e.g. layer 16 in FIG. 1) within which the heater element 22 and optional leads 24 and stabilisation layer(s) 21 are embedded.

The heating described above can be performed in a vacuum to prevent unwanted oxidisation. In some examples, the process may be performed in an autoclave. In another example, the process can be performed by placing the assembly including the first (28) and second (26) layers of thermoplastic and the heater element 22 and leads 24 in a vacuum bag (not shown in FIG. 3) prior to heating. The vacuum bag should be suitable for withstanding the desired heating temperature. For example, the vacuum bag can be an aluminium vacuum bag.

Accordingly, there has been described a process for making a heater mat of the kind shown in FIGS. 1 and 2.

As described herein, a heater mat 10 in accordance with an embodiment of the invention can be attached to a leading edge component of an aircraft, for example a wing slat. In accordance with an embodiment of the invention, the heater mat 10 includes a thermoplastic outer surface. Thermoplastics such as PEEK are generally difficult to attach to a surface using an adhesive, since adhesives do not typically form a good bond with a PEEK surface. In order to mitigate this problem, in accordance with an embodiment of this invention, the heater mat 10 can be provided with one or more adhesive receiving layers. Examples of this are now described in relation to FIGS. 4 and 5.

Figure 4:
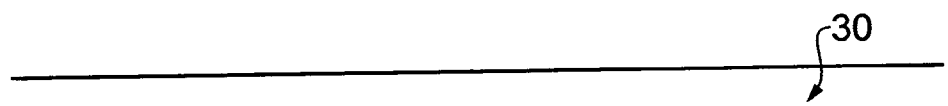
FIGS. 4 and 5 show examples of a heater mat incorporating an adhesive receiving layer in accordance with an embodiment of the invention.
Figure 4:
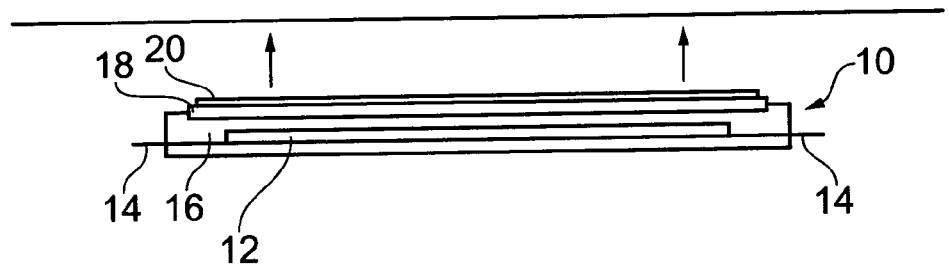
Figure 5:

The example heater mats 10 shown in FIGS. 4 and 5 are generally similar to the heater mat shown in FIG. 1, but each example further includes an adhesive receiving layer 18 as described above. In accordance with an embodiment of the invention, the adhesive receiving layer(s) described herein can comprise a fibrous material. The fibrous material can be selected such that it can be effectively wetted by the thermoplastic of the thermoplastic layer. Examples of suitable fibrous materials include glass cloth, Kevlar, carbon fibre and S ceramic fibre.

In the example of FIG. 4, the adhesive receiving layer 18 is partially embedded within the thermoplastic layer 16 of the heater mat 10, and protrudes from surface of the heater mat 10. The protruding portion of the adhesive receiving layer 18 can thus receive an adhesive 20 (e.g. epoxy resin) for adhering the heater mat 10 to a surface 30.

The adhesive receiving layer 18 can be added to the heater mat 10 during manufacture, by laying it over one of the layers of thermoplastic (e.g. the layer 26 or the layer 28 shown in FIG. 3) prior to heating. During heating, the thermoplastic melts and partially receives the adhesive receiving layer 18, although a portion of the layer 18 is left to protrude from the surface of the heater mat 10 as described above.

In the alternative example shown in FIG. 5, an intermediate layer 19 is provided, for attaching the adhesive receiving layer 18 to the thermoplastic layer 16. The intermediate layer 19 typically comprises a material which forms a good bond with both the thermoplastic layer 16 and the adhesive receiving layer 18. By way of example, the intermediate layer 19 may comprise a different thermoplastic to the thermoplastic making up the layer 16. In particular, the thermoplastic of the intermediate layer 19 may comprise a thermoplastic that makes a better bond with a given adhesive than does the thermoplastic of the layer 16. In one such example, the layer 16 may comprise PEEK, while the intermediate layer 19 may comprise a polyarylsolphone.

In accordance with an embodiment of the invention, the heater mat 10 can be provided with more than one adhesive receiving layer. By way of example, an adhesive receiving layer such as that described in relation to FIGS. 4 and 5 can be provided on both an upper and lower surface of the thermoplastic layer 16. This can allow the heater mat 10 to be adhered to the surface of an aircraft leading edge component while also allowing a further object (for example, further insulating/protective layers) to be adhered to the upper surface of the mat 10. In one example, one or more conducting/resistive layers can be adhered to the upper surface to form a damage/failure system. Such layers can be provided to detect electrical breakdown should the heater mat 10 suffer mechanical damage caused by outside influences (for example, mechanical failure of the structure it is attached to).

As an alternative to using an adhesive as described above, in accordance with an embodiment of the invention a heater mat comprising a thermoplastic layer can be attached to a surface by heating the thermoplastic above $T_m$, whereby the thermoplastic fuses to the surface. In some examples, the surface (which may typically be metallic) can be treated (e.g. roughened) beforehand, to improve the bond to the thermoplastic of the heater mat.

It has been found that a bond formed in this manner, between the thermoplastic of the heater mat and the surface of a leading edge component, is extremely strong. Moreover, thermoplastic has a high through thickness strength. In accordance with an embodiment of the invention, the thermoplastic layer of a heater mat can itself be used as a bonding agent, for assembling two or more parts of a leading edge structure.

The parts to be assembled may typically comprise a skin of the leading edge and a supporting member such as a rib (e.g. an aerodynamic cardinal or rib), longeron or stringer.

Figure 6:
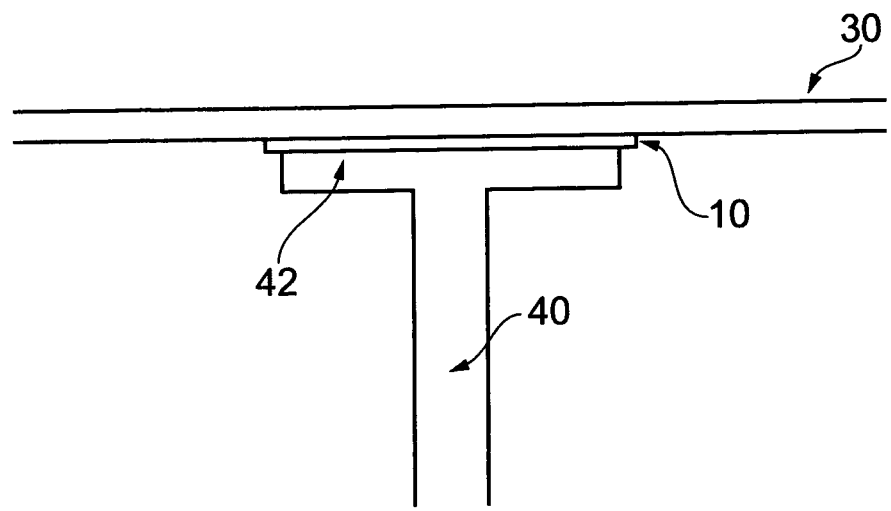
FIG. 6 illustrates an example of the use of a heater mat as a bonding means in accordance with an embodiment of the invention.

By way of example, the arrangement shown in FIG. 6 allows the attachment of a supporting rib 40 to the inside surface of a leading edge 30 of an aircraft.

In the example shown in FIG. 6, the heater mat 10 is interposed between the rib 40 and the leading edge 30 to form the bond. The thermoplastic layer of the heater mat 10 has been fused (by heating the thermoplastic above its melting point $T_m$) to both the rib 40 and the leading edge 30.

Bonds of this kind can, in some examples, replace the provision of conventional attachment means such as rivets. This has the additional advantage that no (typically metallic) rivets or such like are required to pass through a heater mat provided between the rib 40 and the leading edge 30, whereby possible short circuiting within the heater element is avoided.

Moreover, the use of a heater mat 10 to provide a bond as shown in FIG. 6 allows heating to be applied directly to the portion of the leading edge 30 below the rib 40, even though it is covered by, for example, a flange 42 of the rib 40. In conventional arrangements, heater mats 10 have been provided over the flange 42, whereby heat produced by the heater mat is required to pass through the flange 42 before reaching the leading edge 30. Accordingly, the heating power produced in conventional arrangements is substantially reduced owing to the temperature gradient across the rib flange 42.

Figure 7:
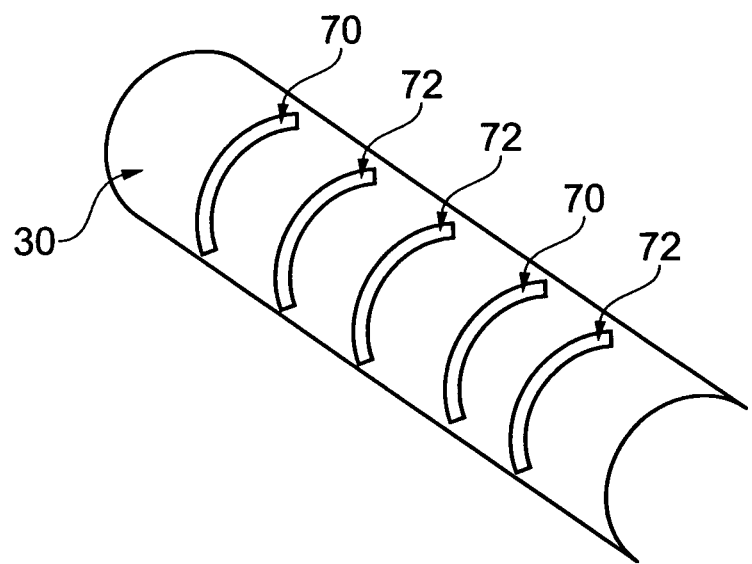
FIG. 7 schematically shows an example of a wing slat comprising a plurality of supporting ribs attached a skin using a heater mat in accordance with an embodiment of the invention.

FIG. 7 schematically shows a portion of an aircraft wing slat. The leading edge 30 of the slat is provided with a plurality of spaced supporting ribs. In this example, the ribs include a plurality of cardinal ribs 70 and a plurality of aerodynamic ribs 72. The aerodynamic ribs 72 are spaced in between adjacent cardinal ribs 70. As can be seen from FIG. 7, the ribs in conventional arrangements, which are typically provided with flanges for attachment as discussed above, may inhibit access to many portions of the leading edge 30 for the purposes of ice-protection by heating. However, by employing an arrangement of the kind described above in relation to FIG. 6, this problem can be solved, while simultaneously providing strong and robust bonding of the ribs 70, 72 to the leading edge 30.

Leading edges structures in aircraft may typically comprise surfaces that are curved in more than one direction. To conform with the double-curved shape of a surface in an aircraft leading edge component, a heater mat according to an embodiment of the invention can also be provided with a double curved shape. This can allow an ice-protection system including one or more heater mats of the kind described herein to apply even and effective heating across the surface of the leading edge.

Figure 8:
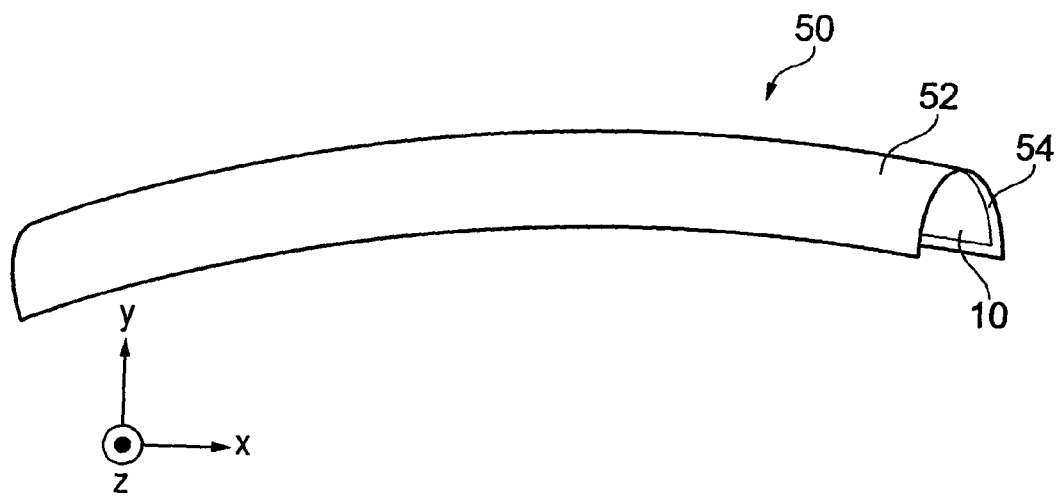
FIG. 8 shows an example of a double curved object with a heater mat applied thereto in accordance with an embodiment of the invention.

FIG. 8 shows an example of a double curved object in conjunction with which a heater mat 10 according to an embodiment of the invention can be used. The double curved surface in this example is a portion of an aircraft wing slat 50. It is envisaged that heater mats according to this invention can be used with other kinds of object having a double curved surface.

As shown in FIG. 8, a heater mat 10 is applied to an inner surface 54 of the aircraft wing slat 50. With reference to the Cartesian axes shown in FIG. 8, the surface 54 is curved around the x-axis and the z-axis (which extends from the plane of the page). Accordingly, the surface 54 in this example is double curved.

In some examples, the heater mat 10 may be constructed in situ on the double curved surface. For example, the heater mat may be constructed by applying a first thermoplastic layer to the double curved surface, then applying the heater element to the first thermoplastic layer (optionally, the first thermoplastic layer may be heated to fuse it to the surface, prior to the application of the heater element), then applying a second thermoplastic layer and heating the assembly. It should be noted that these methods may also be used to make flat heater mats in situ.

The heater element may be applied using the methods described above (e.g. using a metal spraying process).

The thermoplastic layers may be applied in a number of ways. For example, each thermoplastic layer may be applied as a powder coating, which melts during the heating process. Alternative methods include flame spraying and dispersion coating.

As described above, during heating, the thermoplastic can fuse directly to the surface 54. As described above, the thermoplastic can be heated to a temperature in the range 360-380° C. On cooling (which may take place rapidly (quenching) as described above), the thermoplastic enters its glassy state, resulting in a double curved heater mat that follows the double curved shape of the surface 54.

In an alternative method, the heater mat can be constructed using a mould that corresponds to the intended shape. The moulded heater mat can then be applied to the double curved surface, using, for example, an adhesive. As described above in relation to FIGS. 4 and 5, one or more adhesive receiving layers can be provided (e.g. a fibrous material such as glass cloth) to receive the adhesive. Adhesive receiving layers can be used in situations where it is not practical to construct the heater mat in situ (e.g. because vacuum conditions may be required). An example of this is illustrated in FIG. 9.

Figure 9:
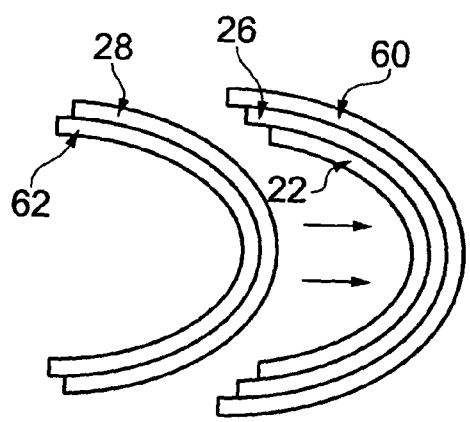
FIG. 9 shows an example of the manufacture of a double curved heater mat in accordance with an embodiment of the invention.

In FIG. 9, a first layer of thermoplastic 28 is applied to a mould section 62 bearing a double curved surface that corresponds to the intended shape. A second layer of thermoplastic 26 is also applied to a mould section 60 bearing a double curved surface that corresponds to the intended shape. The thermoplastic layers can, for example, be applied using powder coating, flame spraying or dispersion coating as described above in relation to FIG. 8.

A heater element 22 can then be applied to one of the thermoplastic layers (in this example, the second thermoplastic layer 26), and any desired connection leads and stabilisation layers can be put in place.

The two sections (60, 62) of the mould are then brought together as depicted by the arrows in FIG. 9, and the assembly is heated to allow the thermoplastic layers to fuse. It is noted that when a mould is used in this fashion, no special provision need be made to apply a vacuum during heating, as the mould itself excludes air from contacting the thermoplastic.

Following cooling (which, again, may be rapid), the resulting heater mat, with its double curved shape can be removed from the mould and applied to the intended double curved surface as described above.

Whether the double curved heater mat is made in situ or is made using a mould, stabilisation layers can be included in much the same way as is described above in relation to FIG. 3.

Accordingly there has been described an aircraft leading edge ice protection to system. The system includes: a thermoelectric heater mat attachable to a leading edge component of an aircraft, the heater mat comprising: an electrically resistive heater element embedded in a thermoplastic layer, the thermoplastic layer having a first surface; and a first adhesive receiving layer located on a surface of the thermoplastic layer. A method of making an aircraft leading edge ice protection system, the method comprising: making a thermoelectric heater mat by embedding an electrically resistive heater element in a thermoplastic layer, the thermoplastic layer having a first surface; and locating a first adhesive receiving layer on a surface of the thermoplastic layer.

The invention claimed is:

1. An aircraft leading edge ice protection system, the system comprising:
    a thermoelectric heater mat attached to a to an aerodynamic leading edge component of an aircraft, the heater mat comprising:
        an electrically resistive heater element completely encapsulated in a thermoplastic layer, the thermoplastic layer having a first surface;
        a first adhesive receiving layer located on the first surface of the thermoplastic layer; and
        an adhesive applied to the first adhesive receiving layer,
    wherein an embedded portion of the first adhesive receiving layer is received in the thermoplastic layer and a protruding portion of the first adhesive receiving layer protrudes from the first surface of the thermoplastic layer.

2. The aircraft leading edge ice protection system of claim 1, wherein the thermoplastic layer comprises Polyetheretherketone (PEEK).

3. The aircraft leading edge ice protection system of claim 1 comprising a second adhesive receiving layer located on a surface of the thermoplastic layer.

4. The aircraft leading edge ice protection system of claim 3, wherein the second adhesive receiving layer is located on a surface of the thermoplastic layer that is opposite the first surface.

5. The aircraft leading edge ice protection system of claim 3, wherein the second adhesive receiving layer is partially embedded within the thermoplastic layer and a part thereof protrudes from the first surface of the thermoplastic layer.

6. The aircraft leading edge ice protection system of claim 1, comprising a layer intermediate the thermoplastic and the first adhesive receiving layer for attaching the first adhesive receiving layer to the thermoplastic.

7. The aircraft leading edge ice protection system of claim 1, wherein the first adhesive receiving layer comprises a fibrous material.

8. The aircraft leading edge ice protection system of claim 1, wherein the heater mat further comprises a stabilising layer embedded in the thermoplastic layer.

9. The aircraft leading edge ice protection system of claim 8, wherein the stabilising layer comprises a glass.

10. The aircraft leading edge ice protection system of claim 1, wherein the heater mat has double-curved shape to conform with a corresponding double-curved surface of an aircraft leading edge component to which the heater mat is to be applied.

11. An aircraft leading edge component comprising the aircraft leading edge ice protection system of claim 1.

12. The aircraft leading edge component of claim 11, wherein the component comprises a leading edge of an aircraft wing.

13. An aircraft comprising the aircraft leading edge component of claim 11.

14. An aircraft leading edge ice protection system, the system comprising:
    a thermoelectric heater mat attached to an aerodynamic leading edge component of an aircraft, the heater mat comprising:
        an electrically resistive heater element completely encapsulated in a thermoplastic layer, the thermoplastic layer having a first surface;
        a first adhesive receiving layer located on the first surface of the thermoplastic layer; and
        an adhesive applied to the first adhesive receiving layer,
    wherein a lower portion of the first adhesive receiving layer is below the first surface of the thermoplastic layer and an upper portion of the first adhesive receiving layer is above the first surface of the thermoplastic layer.

15. A method of making an aircraft leading edge ice protection system, the method comprising:

making a thermoelectric heater mat by completely encapsulating an electrically resistive heater element in a thermoplastic layer, the thermoplastic layer having a first surface;

locating a first adhesive receiving layer on the first surface of the thermoplastic layer;

applying an adhesive to the first adhesive receiving layer; and using the adhesive to attach the thermoelectric heater mat to an aerodynamic leading edge component of an aircraft;

wherein an embedded portion of the first adhesive receiving layer is received in the thermoplastic layer and a protruding portion of the first adhesive receiving layer protrudes from the first surface of the thermoplastic layer.

16. The method of claim 15, wherein the thermoplastic layer comprises Polyetheretherketone (PEEK).

17. The method of claim 15 comprising locating a second adhesive receiving layer on a surface of the thermoplastic layer.

18. The method of claim 17, comprising locating a second adhesive receiving layer on a surface of the thermoplastic layer that is opposite the first surface.

19. The method of claim 17, wherein said locating the second adhesive receiving layer comprises partially embedding said second adhesive receiving layer within the thermoplastic layer such that it protrudes from the first surface of the thermoplastic layer.

20. The method of claim 17, comprising locating a layer intermediate the thermoplastic and the first adhesive receiving layer for attaching the first adhesive receiving layer to the thermoplastic.

21. The method of claim 15, wherein the first adhesive receiving layer comprises a fibrous material.

22. The method of claim 15 further comprising:
applying an adhesive to the second adhesive receiving layer; and
using the adhesive to attach a further object to the heater mat.

23. The method of claim 22, wherein the further object is a supporting rib of the leading edge component.

24. The method of claim 15, wherein making the heater mat comprises adding a stabilising layer to the mat.

25. The method of claim 24, wherein the stabilising layer comprises a glass.

26. The method of claim 15, wherein making the heater mat comprises using a mould to produce a shaped thermoplastic layer having a double-curved shape that corresponds to a double-curved surface of an aircraft leading edge component to which the heater mat is to be applied.

* * * * *

UNITED STATES PATENT AND TRADEMARK OFFICE
CERTIFICATE OF CORRECTION

PATENT NO.        : 8,523,113 B2
APPLICATION NO.   : 12/738371
DATED             : September 3, 2013
INVENTOR(S)       : James William Atkinson Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this
Fifteenth Day of September, 2015

Michelle K. Lee
*Director of the United States Patent and Trademark Office*